Figure 1:
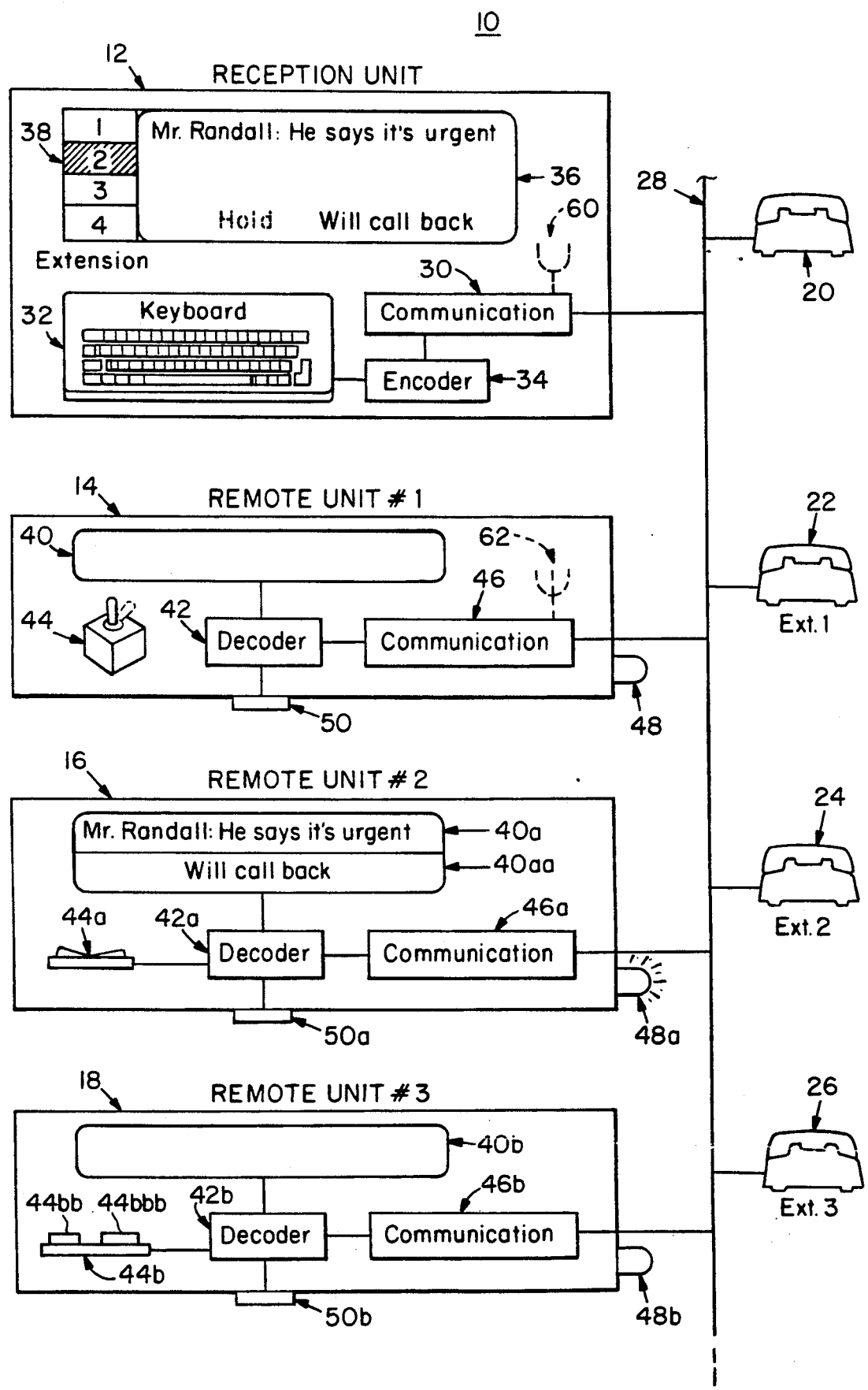

United States Patent [19]

Smith

[11] Patent Number: 5,228,073
[45] Date of Patent: Jul. 13, 1993

[54] CALL IDENTIFICATION DISPLAY SYSTEM
[76] Inventor: Frederick D. Smith, 261 Weston Rd., Wellesley, Mass. 02181
[21] Appl. No.: 733,305
[22] Filed: Jul. 22, 1991
[51] Int. Cl.$^5$ .............. H04M 1/72; H04M 5/04; H04M 9/00
[52] U.S. Cl. .................. 379/57; 379/170; 379/387; 379/396
[58] Field of Search .......... 379/142, 57, 170, 172, 379/173, 387, 396

[56] References Cited

U.S. PATENT DOCUMENTS 4,723,273  2/1988  Diesel et al. ............ 379/142 X
4,924,496  5/1990  Figa et al. ............... 379/142

FOREIGN PATENT DOCUMENTS 0005741  1/1987  Japan ...................... 379/170

Primary Examiner—Stafford D. Schreyer
Attorney, Agent, or Firm—Iandiorio & Dingman

[57] ABSTRACT

A call identification display system includes a reception unit; at least one remote user unit; and a communication link such as conventional interface electronics located in the reception unit and the remote units interconnected by cables or rf or laser transmitter and receiver systems; the reception unit has a data entry device such as a keyboard for entering a message including at least identifying indicia for an incoming caller and a display device; each remote user unit includes a display displaying the message from the reception unit identifying the incoming caller and an instruction selector for selecting one of a number of predetermined instructions for display in the display device in the reception unit for directly disposition of the incoming call.

8 Claims, 1 Drawing Sheet

CALL IDENTIFICATION DISPLAY SYSTEM

FIELD OF INVENTION

This invention relates to a call identification display system, and more particularly to such a system which enables a receptionist to remotely transmit an identification of a caller and receive instructions for disposition of the call.

BACKGROUND OF INVENTION

Telephone interruptions are a nuisance and a necessary evil of everyday business. Often during an important telephone conference or meeting a receptionist is given instructions to hold all calls. However, it frequently happens that a telephone call comes for a person from a caller to whom the receptionist believes the person urgently desires to speak. This often requires an external interruption of the ongoing phone call or meeting with a flurry of arm-waving and facial contortions while the receptionist attempts to get the attention of the person and get his or her message across. This technique, while often amusing, disrupts the telephone conversation and does not give a professional, smooth transfer from an ongoing conversation to the new business at hand. This old system is less than satisfactory and can appear rude or thoughtless to other participants. In contrast, when a person about to enter a meeting or engage in a telephone conference instructs the receptionist to "hold all calls", important calls may be lost: an unanticipated call from a party to whom the person wishes to speak will be cut off as well, for the receptionist has been given no exceptions. Providing an exception list is simply impractical: the receptionist cannot keep track of each person's changing exception list and the persons themselves cannot be expected to create and maintain an ever-changing list of exceptions.

SUMMARY OF INVENTION

It is therefore an object of this invention to provide a call identification display system which discreetly informs a person of an incoming telephone call.

It is a further object of this invention to provide such a call identification display system which displays to the person the identity and/or other information concerning the caller without disrupting the ongoing conversations.

It is a further object of this invention to provide such a call identification display system which enables a person to discreetly convey instructions regarding disposition of an incoming call.

It is a further object of this invention to provide such a call identification display system which enables a person to accept or to request deferral or transfer of the incoming call.

It is a further object of this invention to provide such a call identification display system which is silent and unobtrusive so as not to interrupt an ongoing conversation or meeting.

It is a further object of this invention to provide such a call identification display system which easily and without interruption defers unwanted calls and accepts desired calls and allows smooth and expedient conclusion of the current meeting or call so the incoming call may be dealt with. It also allows the person in charge to make the decision without disrupting the person's ongoing business.

The invention results from the realization that a truly effective system for identifying and disposing of incoming calls can be effected quickly, remotely and discreetly by providing a receptionist with means for transmitting and displaying to a person a message including the identity of an incoming caller and receiving back from that person a display of an instruction from that person directing disposition of the incoming call.

This invention features a call identification display system having a reception unit, at least one remote user unit, and means for communicating between the reception unit and the at least one remote user unit. The reception unit has a data entry device for entering a message including at least identifying indicia for an incoming caller and a display device. Each remote user unit includes display means for displaying the message from the reception unit identifying the incoming caller and an instruction selector for selecting one of a number of predetermined instructions for display in the display device in the reception unit for directing disposition of the incoming call.

In a preferred embodiment the data entry device includes a keyboard and an encoder. The display device in the reception unit may include a first display portion for displaying an instruction received from a remote unit and a second display portion for simultaneously displaying the message created at the reception unit. The display means at each of the remote units may include a first display portion for displaying a message received from the reception unit and second display portion for simultaneously displaying the instruction generated at the remote unit. The instruction selector may include switching means and also decoding means responsive to the switching means to produce the instruction selected by the switching means. The reception unit may include routing means for indicating the remote unit to be addressed for an incoming call. There may also be means associated with each remote unit for indicating that a message has been received from the reception unit.

DISCLOSURE OF PREFERRED EMBODIMENT

Other objects, features and advantages will occur to those skilled in the art from the following description of a preferred embodiment and the accompanying drawings, in which:

FIG. 1 is a schematic block diagram of a call identification display system according to this invention.

The invention may be accomplished in a call identification display system which includes a reception unit, one or more remote user units, and some means for communicating between the reception unit and each of the remote user units. The communication means may be conventional interface electronics located in the reception unit and the remote units interconnected by cables, or it may be an RF or laser transmitter and receiver system. The reception unit has a data entry device such as a keyboard for entering a message including at least identifying indicia of an incoming caller. In addition to the name, address, company affiliation and other identifying indicia, the message may include statements to indicate the urgency or timeliness of the call, the subject of it, and similar information. Each remote user unit includes display means for displaying the message generated from the keyboard in the reception unit and identifying the incoming caller. Each remote user unit also includes an instruction selector for selecting one of a number of predetermined instructions for display in the display device in the reception unit in order to direct disposition of the incoming call by the receptionist. The display means in each remote unit may include two display areas or two separate display elements for displaying not only the message received from the reception unit, but the instruction created at the remote unit. The instruction selector may be a simple switch having a number of positions. For example, a two-position switch could generate a first message, "Hold", or a second message, "Call Back". Multiple-position switches with additional contacts could of course be used to indicate many more predetermined instructions. Each remote unit may also include indicator means such as a light or low, subtle audible tone, to alert the person at that extension that a message is on the display from the receptionist.

There is shown in FIG. 1 a call identification display system 10 according to this invention including a reception unit 12 and a number of remote units 14, 16, 18, denoted as Remote Unit #1, Remote Unit #2 and Remote Unit #3. Each remote unit is associated with a telephone. Reception unit 12 has associated with it telephone 20, while each of units 14, 16 and 18 have associated with it telephones 22, 24 and 26, labelled Extension 1, Extension 2 and Extension 3, respectively. The telephones 22, 24 and 26 communicate with each other and remote units 14, 16 and 18 communicate with reception unit 12 over a common cable 28. Reception unit 12 is interconnected with cable 28 by means of a communication circuit 30 and includes a keyboard 32 for entering data through encoder 34 to be displayed in display 36. Reception unit 12 also includes a routing display 38 for indicating which of the present remote units is being addressed. Remote unit 14 includes a display 40 and a decoder 42 which includes a number of different predetermined instructions which can be selected by the various settings on switch 44. Communication circuit 46 interfaces remote unit 14 with reception unit 12 over common cable 28. Remote unit 14 also includes a visual display, lamp 48, and/or an optional audible display, tone 50, which may be used to alert the user at the remote unit that a message from reception unit 12 is present on display 40. Units 16 and 18 are constructed essentially the same as remote unit 14, with the exception that in remote unit 16 there are two display areas 40a and 40aa so that both the message from reception unit 12 and the instruction generated at remote unit 16 can be simultaneously displayed to assist the user at remote unit 2. Also, in remote unit 16, switch 44a is a conventional thumb switch instead of a toggle switch as shown in remote unit 14. In remote unit 18, switch 44b is implemented using a pair of button contacts 44bb and 44bbb. Although reception unit 12 and remote units 14, 16 and 18 are shown interconnected by a common cable 28, this is not a necessary limitation of the invention. For example, the communications may be effected by RF radio transmission as indicated by the antennas 60 and 62 shown in phantom associated with communication circuits 30 and 46, respectively.

In operation, when the receptionist at reception unit 12 receives an incoming call on telephone 28, the receptionist will identify the proper extension which appears as extension "2" on display 38 and will enter on the keyboard 32 the information about the caller, for example, "Mr. Randall: He says it's urgent." This message is encoded by encoder 34 and through communications 30 is transmitted along cable 28 to remote unit 16, #2. There the message is received by communications circuit 46a, decoded by decoder 42a, and displayed in display 40a. The user at remote unit 2 then decides whether he wishes to have the receptionist "Hold" the call so that he can take it, or to simply tell the caller that he will "Call Back". In this case, the user at remote unit 2 decides he would prefer to call back. He therefore presses the right side of switch 44a, which enables decoder 42a to generate the message "Call Back", which it then sends through communication circuit 46a over cable 28 to the communication circuit 30 in reception unit 12.

This communication is received by encoder 34 and presented as "Call Back" on display 36. While it is essential to show the "Call Back" or "Hold" message on display 36, it is not necessary but is desirable to display the message "Mr. Randall: He says it's urgent." Similarly, in remote unit 2 it is essential that the message "Mr. Randall: He says it's urgent" be displayed, but the instruction, "Call Back" or "Hold", as the case may be, is not necessary to display but is desirable. It is desirable to display the messages at the units where they are generated so that the person generating them can be sure that the correct message has been forwarded. The messages can be displayed serially, as would be the case with the single display devices 40 and 40b in remote units 14 and 18, respectively; or they may be displayed simultaneously such as with display 36 where there is a single display but two display areas; or, as in remote unit 16, where there are two separate display elements 40a and 40aa.

As soon as remote unit 16 is addressed by reception unit 12, an indication that a message is arriving may be conveyed to the user by the lighting of lamp 48a or the sounding of tone 50a, or both.

Although specific features of the invention are shown in some drawings and not others, this is for convenience only as each feature may be combined with any or all of the other features in accordance with the invention.

Other embodiments will occur to those skilled in the art and are within the following claims:

What is claimed is:

1. A call identification display system comprising: a reception unit, at least one remote user unit; and means for communicating between said reception unit and said at least one remote user unit; said reception unit having a data entry device for entering a message including at least identifying indicia for an incoming caller, and a display device; said remote user unit including display means for displaying a message from said reception unit identifying the incoming caller and an instruction selector for selecting one of a number of predetermined instructions for display in said display device in said reception unit for directing disposition of an incoming call.

2. The call identification display system of claim 1 in which said data entry device includes a keyboard and an encoder.

3. The call identification display system of claim 1 in which said display device in said reception unit includes a first display portion for displaying a said instruction and a second display portion for simultaneously displaying said message.

4. The call identification display system of claim 1 in which said display means in each said remote unit includes a first display portion for displaying a said message and second display portion for simultaneously displaying a said instruction.

5. The call identification display system of claim 1 in which said instruction selector includes switching means.

6. The call identification display system of claim 5 in which said instruction selector includes decoding means responsive to said switching means to produce the instruction selected by said switching means.

7. The call identification display system of claim 1 in which said reception unit includes routing means for indicating the remote unit to be addressed for an incoming call.

8. The call identification display system of claim 1 further including means, associated with each remote unit, for indicating that a message has been received from the reception unit.

* * * * *